US009689997B2

(12) United States Patent
Konkle et al.

(10) Patent No.: US 9,689,997 B2
(45) Date of Patent: Jun. 27, 2017

(54) SYSTEMS AND METHODS FOR MODULAR IMAGING DETECTORS

(71) Applicant: General Electric Company, Schenectady, NY (US)

(72) Inventors: Nicholas Ryan Konkle, Waukesha, WI (US); John Michael Sabol, Sussex, WI (US); James Michael Gent, Milwaukee, WI (US); Aaron Couture, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 14/476,869

(22) Filed: Sep. 4, 2014

(65) Prior Publication Data

US 2016/0070006 A1 Mar. 10, 2016

(51) Int. Cl.
*G01T 1/29* (2006.01)
*G01T 1/208* (2006.01)
*H04N 5/32* (2006.01)
*H04N 5/378* (2011.01)
*G01T 1/20* (2006.01)

(52) U.S. Cl.
CPC ............ *G01T 1/2928* (2013.01); *G01T 1/208* (2013.01); *G01T 1/2018* (2013.01); *H04N 5/32* (2013.01); *H04N 5/378* (2013.01)

(58) Field of Classification Search
CPC .................................................. G01T 1/2018
USPC ...................................................... 257/E27.13
See application file for complete search history.

(56) References Cited

U.S. PATENT DOCUMENTS

| 6,055,450 | A | * | 4/2000 | Ashburn ............ A61B 17/3403 250/363.04 |
| 6,856,670 | B2 | | 2/2005 | Hoheisel |
| 6,982,424 | B2 | | 1/2006 | Vafi et al. |
| 7,078,702 | B2 | | 7/2006 | Ringermacher et al. |
| 7,521,685 | B2 | | 4/2009 | Hennessy et al. |
| 7,742,090 | B2 | | 6/2010 | Street et al. |

(Continued)

FOREIGN PATENT DOCUMENTS

| EP | 2372397 A2 | 10/2011 |
| JP | 4231414 B2 | 2/2009 |
| WO | 2013050229 A1 | 4/2013 |

OTHER PUBLICATIONS

Machine Translation of JP 4231414.*

(Continued)

*Primary Examiner* — Yara B Green
(74) *Attorney, Agent, or Firm* — Dean D. Small; The Small Patent Law Group, LLC

(57) ABSTRACT

An imaging system includes plural modular imaging detectors and a readout electronics unit. Each modular imaging detector includes pixels configured to collect imaging data, a substrate on which the pixels are disposed, and a mechanical interconnection feature. The mechanical interconnection feature is configured to cooperate with a corresponding mechanical interconnection feature of at least one other of the modular imaging detectors to directly join the modular imaging detector to the at least one other of the modular imaging detectors. The readout electronics unit is configured to be operably coupled to the modular imaging detectors and to receive signals corresponding to the imaging data from the modular imaging detectors.

19 Claims, 10 Drawing Sheets

(56) References Cited

U.S. PATENT DOCUMENTS

| | | | |
|---|---|---|---|
| 8,431,902 B2 | 4/2013 | Nakatsugawa | |
| 2006/0113481 A1* | 6/2006 | Murphy | A61B 6/00 250/370.09 |
| 2012/0153176 A1* | 6/2012 | Tsukerman | A61B 6/037 250/370.09 |
| 2013/0306875 A1 | 11/2013 | Wei | |

OTHER PUBLICATIONS

Joseph T. Smith, et al, "Optically Seamless Flexible Electronic Tiles for Ultra Large-Area Digital X-Ray Imaging", Components, Packaging and Manufacturing Technology, IEEE Transactions on Jun. 2014 (vol. 4, Issue: 6).

PCT Invitation to Pay Additional Fees issued in connection with corresponding Application No. PCT/US2015/043115 dated Nov. 9, 2015.

* cited by examiner

SYSTEMS AND METHODS FOR MODULAR IMAGING DETECTORS

BACKGROUND OF THE INVENTION

The subject matter disclosed herein relates generally to systems and methods for imaging, for example, X-ray imaging.

Film has been used in various X-ray applications. Several standard film sizes and shapes were developed and used by medical and inspection industries to collect X-ray images, including various curved detectors.

With the advent of digital detector technology, however, fewer sizes of X-ray detectors were generally available due to the cost associated with a single detector. Further, digital detectors may be limited to flat planes. As technology develops for flexible detectors (e.g., organic photo diode detectors) and/or fixed curve detectors (e.g., thinned glass substrate detectors), curved digital detectors may be provided. However, such detectors may still be limited, for example, due to cost, from providing sizes and/or shapes for many of the differently shaped objects that may be desired to be X-ray imaged.

BRIEF DESCRIPTION OF THE INVENTION

In one embodiment, an imaging system is provided including plural modular imaging detectors and a readout electronics unit. Each modular imaging detector includes pixels configured to collect imaging data, a substrate on which the pixels are disposed, and a mechanical interconnection feature. The mechanical interconnection feature is configured to cooperate with a corresponding mechanical interconnection feature of at least one other of the modular imaging detectors to directly join the modular imaging detector to the at least one other of the modular imaging detectors. The readout electronics unit is configured to be operably coupled to the modular imaging detectors and to receive signals corresponding to the imaging data from the modular imaging detectors.

In another embodiment, a system is provided that includes plural modular imaging detectors operably coupled to each other and a readout electronics unit. Each modular imaging detector includes plural pixels configured to collect imaging data, a substrate upon which the pixels are disposed, and a mechanical interconnection feature. The mechanical interconnection feature is configured to cooperate with a corresponding mechanical interconnection feature of at least one other of the modular imaging detectors to directly join the modular imaging detector to the at least one other of the modular imaging detectors. The modular imaging detectors are joined to each other to form a detection unit that is flexible along at least one axis. The readout electronics unit is configured to be operably coupled to the modular imaging detectors and to receive signals corresponding to the imaging data from the modular imaging detectors. The modular imaging detectors are coupled to the readout electronics unit via a shared connection.

In another embodiment, a method is provided that includes providing plural modular imaging detectors. Each modular imaging detector includes plural pixels configured to collect imaging data, a substrate on which the pixels are disposed, and a mechanical interconnection feature. The mechanical interconnection feature is configured to cooperate with a corresponding mechanical interconnection feature of at least one other of the modular imaging detectors to directly join the modular imaging detector to the at least one other of the modular imaging detectors. The method also includes connecting the modular imaging detectors in a predetermined arrangement to form a detection unit. Further, the method includes providing a readout electronics unit to receive signals corresponding to the imaging data from the modular imaging detectors, and electrically coupling the modular imaging detectors to the readout electronics unit.

DETAILED DESCRIPTION OF THE INVENTION

Figure 1:
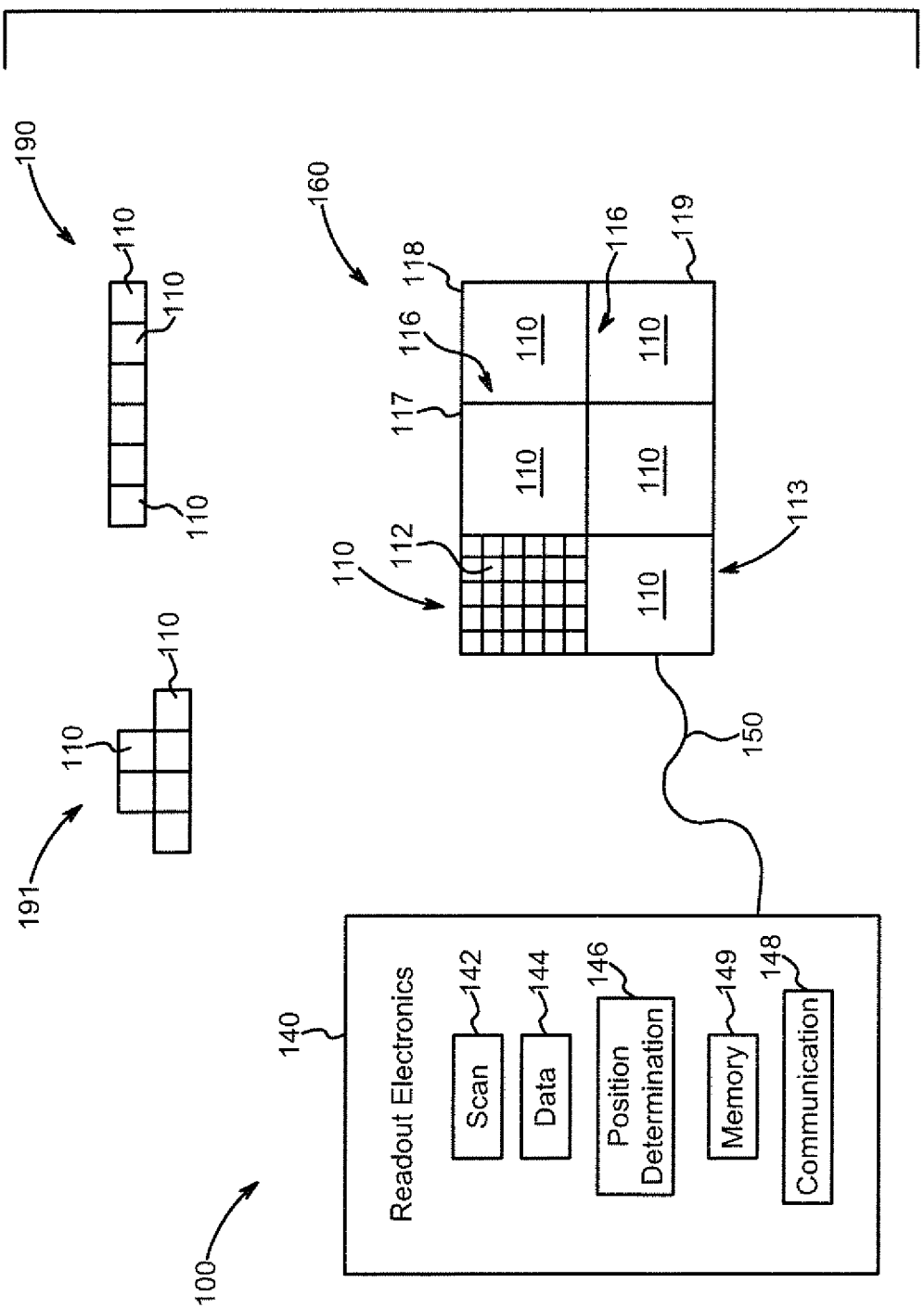
FIG. 1 is a schematic block diagram illustrating an imaging system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for modular imaging detectors. In various embodiments, relatively small modular imaging detectors (e.g., about 50 millimeters by 50 millimeters surface area) are provided that can be connected mechanically or physically (e.g., directly connected via cooperating mechanical features such as tabs, slots, projections, grooves, or the like) with neighboring modular imaging detectors. As used herein, neighboring modular imaging detectors may be understood as sharing a common edge or having edges disposed proximate each other. The modular imaging detectors may also be electrically coupled to neighboring modular imaging detectors. The modular imaging detectors may be arranged in a wide variety of shapes (e.g., configuration of surface area and/or curvature of detection unit formed by modular imaging detectors) and/or sizes to suit a variety of applications.

Various embodiments, for example, provide for relatively large area imagers (e.g., about the size of the surface area of a table or bed) formed from a large number of modular units, as well as relatively small area imagers (e.g., an imager that could be fit within the bend of a knee of a patient) using a small number of modular units. Further, embodiments provide for long, thin, and/or curved (or flexible) detector units that may be used, for example, for pipe inspections. Various embodiments provide robust modular detector units that may be formed into a wide variety of diverse sizes for different customers or users. In some embodiments, the modules may be dis-assembled from one arrangement and rearranged to a new or different configuration (e.g. size and/or shape) on site by a user to provide additional flexibility. In various embodiments, modular detectors may be provided in a flexible detector unit, with a rigid, rugged readout electronics unit provided in a separate component or physical structure.

Various embodiments provide improved imaging and/or improved manufacturing or assembly of imaging devices. A technical effect of at least one embodiment includes improved convenience/flexibility in manufacture and assembly of imaging detector units (e.g., only one module type or design may be utilized in a wide variety of applications calling for differently sized or shaped detector units). A technical effect of at least one embodiment includes improved flexibility in use of imaging detector units. A technical effect of at least one embodiment includes improved operation or maintenance costs (e.g., due to the use of modular units that may be acquired in relatively high volumes and used with a variety of different detectors, the need to acquire and/or store different detector units may be reduced or eliminated).

FIG. 1 illustrates an imaging system 100 in accordance with an embodiment. As seen in FIG. 1, the imaging system 100 includes plural modular imaging detectors 110, a readout electronics unit 140, and a link 150 joining the modular imaging detectors 110 and the readout electronics unit 140. Generally, the plural modular imaging detectors 110 are configured to receive waves or photons (e.g., light energy or X-ray radiation, among others) and to provide an electrical signal (e.g., a signal corresponding to imaging data of an object being imaged) in response to the received wave or photon. In the illustrated embodiment, each modular imaging detector 110 includes pixels 112 disposed on a substrate 113 (see also, e.g., FIG. 3 for view of a substrate). In the illustrated embodiment, the pixels 112 are only shown on one of the modular imaging detectors 110 (the modular imaging detector in the upper-left corner as seen in FIG. 1) for ease and clarity of illustration; however, pixels 112 may be disposed on a surface (e.g., a surface configured to receive light, photons, or the like) of each of the modular imaging units 110. For example, in some embodiments, each modular imaging detector 110 may include a reception surface having an area of about 2 inches by 2 inches (or about 50 millimeters by 50 millimeters) covered by hundreds of pixels.

The depicted readout electronics unit 140 is operably coupled to the modular imaging detectors 110 via the link 150, and receives the signals from the modular imaging detectors 110. The modular imaging detectors 110 are each mechanically or physically joined (e.g., via a mating, interlocking, or otherwise cooperating mechanical connection between adjacent or neighboring modular imaging detectors 110). In the illustrated embodiment, the modular imaging detectors 110 are also electrically connected to neighboring or adjacent modular imaging detectors 110, with the depicted group of modular imaging detectors 110 electrically coupled to the readouts electronic module 140 via the link 150. The link 150, for example, may be a single cable or conductive pathway joining the readout electronics unit 140 to the modular imaging detectors 150. Such a single cable or conductive pathway may be understood as a shared connection electrically coupling the readout electronics unit 140 to the modular imaging detectors 110 (which may be electrically coupled to each other). Alternatively, each modular imaging detector 110 may be individually or independently electrically coupled to the readout electronics unit 140 via a dedicated link or pathway (e.g., a link or pathway dedicated to a single modular imaging detector). (See, e.g., FIG. 5 and related discussion.) In some embodiments, all or a portion of the readout electronics unit 140 may be housed in a separate physical component or unit than the modular imaging detectors 110 as seen in FIG. 1. In some embodiments, all or a portion of the readout electronics unit 140 may be housed or contained in a common component with one or more modular imaging units 110 (e.g., the readout electronics unit 140 or a portion thereof may be mounted or coupled to a common substrate with imaging electronics such as photodiodes of the modular imaging detectors 110, and the link 150 may include, for example, one or more vias and/or traces. (See, e.g., FIGS. 3-5 and related discussion).

With continued reference to FIG. 1, the modular imaging detectors 110 are connected or joined together to form a detection unit 160. In some embodiments, the detection unit 160 may be flexible in one or more directions. For example, the detection unit 160 may be flexible along one axis (e.g., longitudinally) but not flexible along another axis (e.g., in a transverse direction). The flexibility of the detection unit 160 may be provided by flexibility in a substrate or support member of the modular imaging detectors 110 and/or via a flexible (e.g., rotatable) joint between modular imaging detectors. (See, e.g., FIGS. 6, 8, and 9 and related discussion.) In the illustrated embodiment, the detection unit 160 includes 6 modular imaging detectors 110 joined in a 2×3 array. Other arrangements or numbers of modular imaging detectors 110 may be utilized in other embodiments. For example, at view 190 of FIG. 1, six modular imaging detectors 110 are shown arranged in a row. As another example, at view 191 of FIG. 1, two modular imaging detectors 110 form a row adjacent to a row of four modular imaging detectors 110. It may be noted that the arrangements shown in FIG. 1 are provided by way of example, and other arrangements or numbers of modular imaging units may be used in other embodiments. For example, by changing the number of modular imaging units employed, the size of the detection unit 160 may be varied.

The modular imaging detectors 110 are operably coupled to each other to form the detection unit 160. In the illustrated embodiment, neighboring or adjacent modular imaging detectors 110 are joined with mechanical interconnection features 116. Neighboring or adjacent modular imaging detectors 110 as used herein may be understood as modular imaging detectors 110 that share or extend along a common edge. For example, detectors 117 and 118 share an edge along which they are joined by mechanical interconnection features 116, and are neighboring or adjacent detectors. Similarly, detectors 118 and 119 share an edge along which they are joined by mechanical interconnection features 116, and are neighboring or adjacent detectors. However, detectors 117 and 119 are located diagonally from each other, do not share an edge, and are not neighboring or adjacent detectors (and are not directly joined or coupled to each other by mechanical interconnection features in the illustrated embodiment). It may be noted that detectors 117 and 119 may be understood as indirectly joined to each other, as each are joined to detector 118.

The mechanical interconnection features 116 may be strictly mechanical or physical in some embodiments, and may include or have associated therewith electrical connections (e.g., contacts, vias, traces) in other embodiments. Mechanical interconnection features that are configured to cooperate with each other as used herein may be understood to include features such as projections, tabs, slots, grooves, or the like, and the mechanical interconnection features of mated modular imaging detectors that cooperate with each other may be understood as including features that directly contact and interact with each other (e.g., a tab that engages a slot, a tongue that engages a groove, a latch that engages a surface or projection, a stop that engages a surface to limit an amount of movement, a hinge mechanism, a pin that is accepted by a hole or other opening, or the like). For purposes of clarity and the avoidance of doubt, tiles or detectors that are merely joined to a substrate by adhesive (or otherwise) along with other tiles or detectors joined to the substrate by adhesive (or otherwise) do not join directly to each other, and such mere use of adhesive to join a tile to other tiles and/or a substrate does not constitute the use of mechanical interconnection features as discussed herein.

The use of mechanical interconnection features as described herein helps provide for convenient and reliable positioning and assembly of modular imaging detectors into detection units of various sizes and shapes, providing for flexibility in manufacture, assembly, use, and maintenance of detection units. In various embodiments, the use of mechanical interconnection features (e.g., tabs and slots) that can be engaged and disengaged without damaging or destroying the features or the modular imaging units provides for convenient and reliable disconnection of modular imaging units from a first configuration and re-arrangement into a new configuration. Additionally or alternatively, the use of mechanical interconnection features (e.g., tabs and slots) that can be engaged and disengaged with damaging or destroying the features or the modular imaging units provides for convenient, cost-effective replacement of damaged or worn modular imaging units of a detection unit, thereby reducing maintenance or repair costs. It may be noted that, in various embodiments, the mechanical interconnection features of modular imaging detectors may be configured to provide a movement or allowable range of movement (e.g., pivoting or rotation) of modular imaging detectors joined via the mechanical interconnection features. For example, the mechanical interconnection features of adjacent detectors may cooperate to form a hinge or hinge-like mechanism.

Figure 2:
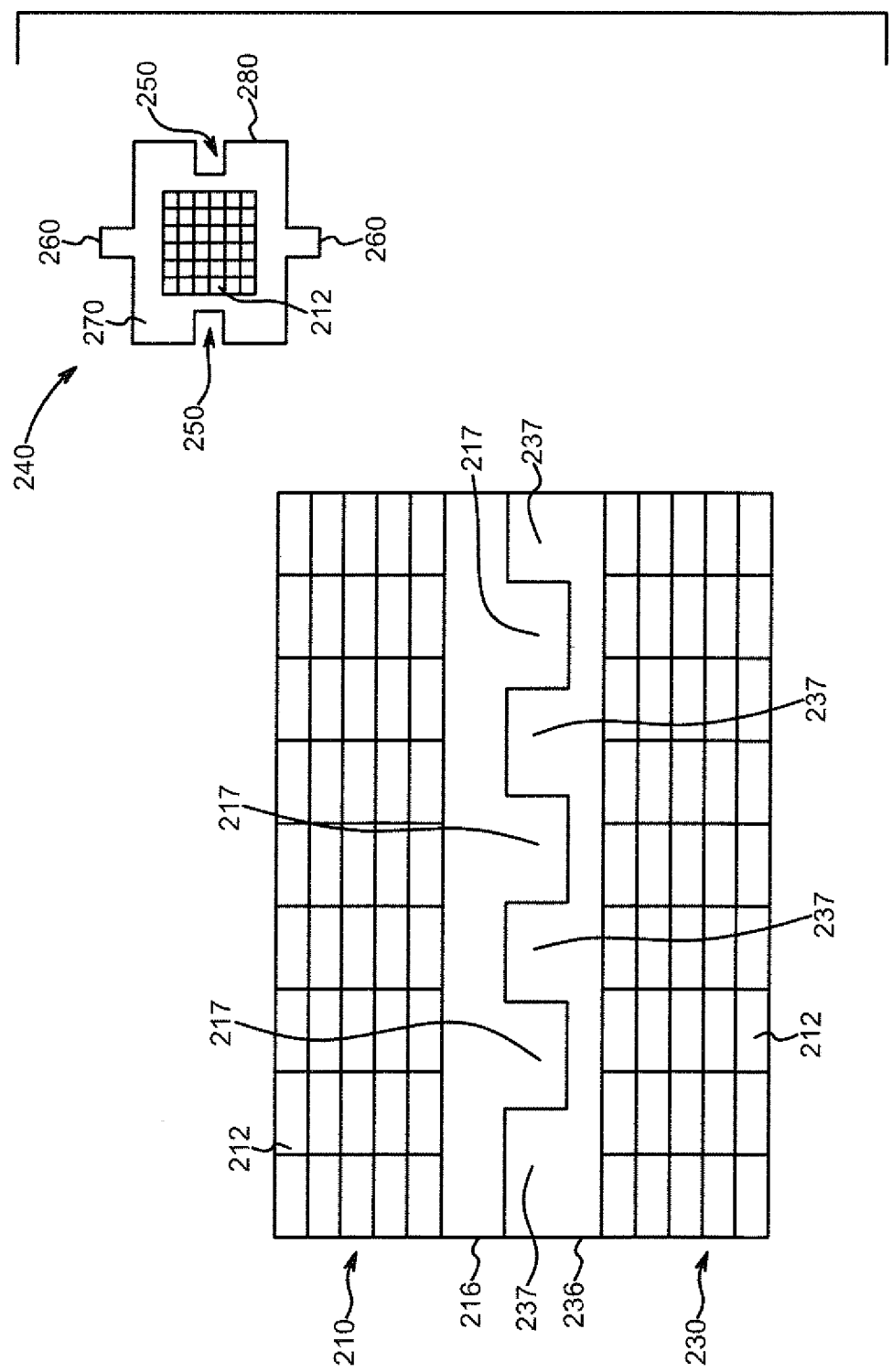
FIG. 2 is a schematic diagram illustrating imaging modular detectors in accordance with various embodiments.

FIG. 2 illustrates an example of a first modular imaging detector 210 and a second modular imaging detector 230 joined by mechanical interconnection features in accordance with various embodiments. In the illustrated embodiment, the first modular imaging detector 210 includes mechanical interconnection feature 216 that includes projections (e.g., tabs) 217 and slots defined between the projections. Similarly, the second modular imaging detector 230 includes mechanical interconnection feature 236 that includes projections (e.g., tabs) 237 and slots defined between the projections 237. The projections 237 of the second modular imaging detector 230 are sized and configured to be accepted by the slots of the first modular imaging detector 210, and the projections 217 of the first modular imaging detector 210 are sized and configured to be accepted by the slots of the second modular imaging detector 230. Thus, the mechanical interconnection feature 216 of the first modular imaging detector 210 and the mechanical interconnection feature 236 of the second modular imaging detector 230 may be understood as configured to cooperate with each other to directly join the first modular imaging detector 210 to the second modular imaging detector 230.

In some embodiments, the fit between one or more of the slots and tabs may be an interference fit, for example to help maintain the neighboring modular imaging detectors in securement to each other. In some embodiments, one or more tabs or slots may have a projection that acts as a latch to help secure the modular imaging detectors in place. Alternatively or additionally, tabs and slots may include one or more projections accepted by a cooperating opening to provide a pivoting relationship between modular imaging detectors joined via the tabs and slots. In some embodiments, the tabs and slots may have traces or vias positioned on or associated with contact points to provide electrical communication between modular imaging units joined by the tabs or slots. As seen in FIG. 2, the first modular imaging detector 210 and the second modular imaging detector 230 each have mechanical interconnection features extending only along one side of a reception surface having pixels 212; however, the mechanical interconnection features may extend along additional sides as well.

For example, as seen in the upper right of FIG. 2, a modular imaging detector 240 includes a mechanical interconnection feature 270 that extends along four sides of a reception surface having pixels 212. The mechanical interconnection feature 270 includes a projection 260 extending from each of two opposite sides, and an opening 250 disposed along the other two sides. The openings 250 may be sized and configured to accept the projections 260 so that multiple modular imaging detectors 240 may be joined together by inserting a projection 260 of a first modular imaging detector into an opening 250 of a second, neighboring modular imaging detector. In various embodiments, the mechanical interconnection features may be integrally formed with a substrate of a modular imaging detector. For example, the modular imaging detector 240 may have a substrate 280 having the mechanical interconnection feature 270 integrally formed about a central portion of the substrate 280 upon which pixels 212 may be disposed. The substrate 280, for example, may be formed using additive manufacturing or 3D printing, with the mechanical interconnection feature 270 printed as part of the substrate 280, or printed upon a pre-formed substrate. The depicted mechanical interconnection feature 270 includes projections 260 and openings 250 centrally located along sides of the modular imaging detector 240 and may be understood as symmetric. It may be noted that other arrangements (e.g., asymmetric arrangements) may be utilize in other embodiments. For example, interconnection features may be offset or asymmetrically arranged to limit the orientations between which modular imaging detectors may be joined. As another example, the mechanical interconnection features may be configured to provide a hinged or pivoting relationship between detectors on one or more sides and a rigid or non-pivoting connection between detectors on one or more other sides. It may be noted that, for clarity of illustration, the mechanical interconnection features are shown relatively large relative to the pixel size in FIG. 2; however, in practice the size of the mechanical interconnection features may be relatively smaller relative to the pixel size (e.g., the mechanical interconnection features may be one pixel width or narrower) to reduce "dead space" or surface area not used for the reception of imaging information.

Figure 3:
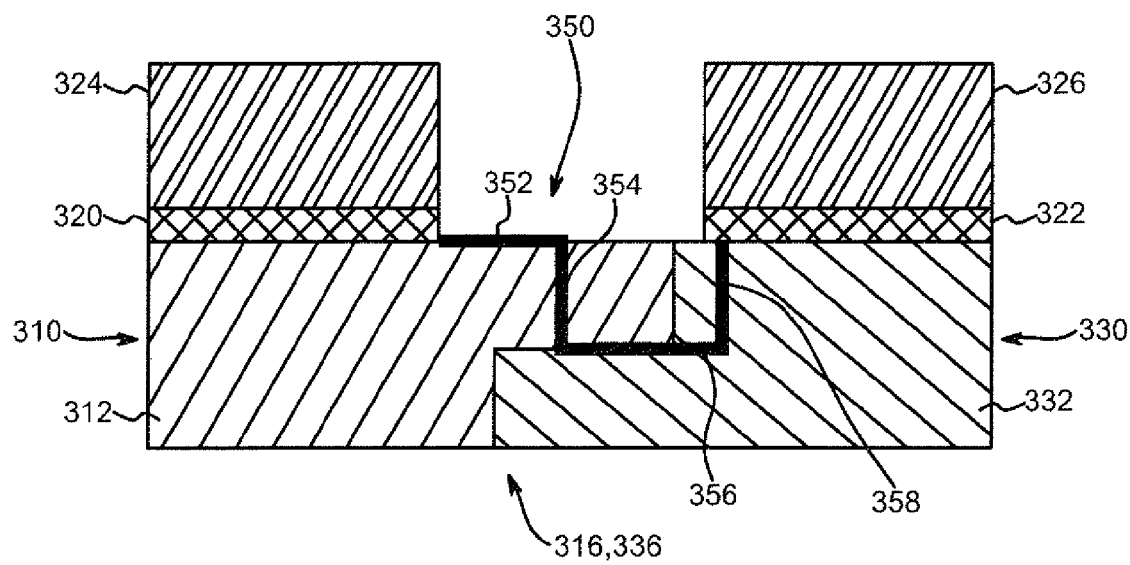
FIG. 3 is a schematic diagram illustrating modular imaging detectors in accordance with various embodiments.

As discussed herein, each modular imaging detector 110 is configured to provide an electrical signal responsive to a received photon or wave to provide imaging information from which an image may be reconstructed. For example, each imaging detector may include photodiodes and an associated scintillator. X-rays passing from a source through an object to be imaged may impact the scintillator, with the scintillator producing light in response to the impinging X-ray. The resulting light from the scintillator may then impact the photodiodes, resulting in an electrical signal that may be output and used to reconstruct an image of the object being X-rayed. FIG. 3 provides a sectional view of modular imaging detectors utilizing scintillators and photodiodes in accordance with various embodiments.

As seen in FIG. 3, a first modular imaging detector 310 is joined to a second modular imaging detector 330 via respective mechanical interconnection features 316, 336. The first modular imaging detector 310 includes a substrate 312 upon which a photodiode 320 is mounted. Further, the first modular imaging detector 310 includes a scintillator 324 disposed above the photodiode 320. X-rays that impact the scintillator 324 result in light emitting from the scintillator 324 and impacting the photodiode 320, resulting in a signal from the photodiode that may be output and utilized along with signals from other photodiodes of a detection unit to reconstruct an image. Similarly, the second modular imaging detector 330 includes a substrate 332 upon which a photodiode 322 is mounted, and a scintillator 326 disposed above the photodiode 322. It should be noted that the use of scintillators and photodiodes in connection with X-ray imaging is provided by way of example, and that other imaging technologies or modalities may be utilized in other embodiments.

As seen in FIG. 3, the mechanical interconnection feature 316 of the first modular imaging detector 310 and the mechanical interconnection feature 336 of the second modular imaging detector 330 cooperate to form a lap joint or overlapping joint. The mechanical interconnection features, for example, may also include one or more projections, latches, grooves or the like to help position or orient the modular imaging detectors with respect to each other and/or secure the modular imaging detectors to each other.

As indicated herein, adjacent or neighboring modular imaging detectors may also be electrically connected to each other, for example, via an electrical pathway associated with the modular imaging detectors (e.g., an electrical pathway associated with or formed as a part of mechanical interconnection features). As seen in FIG. 3, the first modular imaging detector 310 and the second modular imaging detector 330 are electrically connected, or in electrical communication with each other, via a pathway 350. The pathway 350 may include, for example, traces or vias made of an electrically conducting material (e.g., copper), and may be printed or otherwise applied to a circuit board or other substrate. Specifically, the photodiodes of the modular imaging detectors of the illustrated embodiment are in electrical communication with each other. For example, with the photodiodes of each modular imaging detector of a detection unit electrically coupled, a single shared output link may be utilized to output data (e.g., signals) from all of the modular imaging detectors.

The pathway 350 of the illustrated embodiment includes a first portion 352, a second portion 354, and third portion 356, and a fourth portion 358. The first portion 352 extends from the photodiode 324 along an exterior surface of the first modular imaging detector 310, and may be understood as a trace. The second portion 354 extends from the end of the first portion 352 and through the mechanical interconnection feature 316 of the first modular imaging detector 310, and may be understood as a via (e.g., a hole plated with a conductive material such as copper). The third portion 356 extends from the end of the second portion 354, along one or both sides of joined surfaces of the mechanical interconnection features 316, 336, and into the interior of the second modular imaging detector 330. The third portion 356 may include one or more traces along a surface of one or both mechanical interconnection features 316, 336, as well as a via extending into the second modular imaging detector 330. The fourth portion 358 extends from the end of the third portion 358 into contact with the photodiode 322 at or near the surface of the substrate 332 of the second modular imaging detector 330, and may include a via. As seen in FIG. 3, at least a portion of the pathway 350 may be associated with the mechanical interconnection features (e.g., by one or more traces extending along a surface or surfaces of the mechanical interconnection features and/or by one or more vias extending through a depth or depths of the mechanical interconnection features). Electrical connections formed between or among various modular imaging units as described herein allows for simplified connection with readout circuitry or other external circuitry (e.g., via a shared or common link) in various embodiments.

Returning to FIG. 1, the readout electronics unit 140 may be understood as an electronic circuitry module configured to perform one or more tasks as described herein. In various embodiments, all or a portion of the readout electronics unit 140 may be disposed in a separate housing from the detection unit 160, while, in some embodiments, all or a portion of the readout electronics unit 140 may be housed in or disposed on a common structure (e.g., substrate) as one or more aspects of one or more modular imaging detectors 110. For example, readout electronics may be disposed on a substrate and interposed between all or a portion of a photodiode or imaging pixels and the substrate, and/or disposed on one or more sides of a photodiode or imaging pixels. The readout electronics unit 140 may, in various embodiments, be understood as a processing unit that may include processing circuitry configured to perform one or more tasks, functions, or steps discussed herein. It may be noted that "processing unit" as used herein is not intended to necessarily be limited to a single processor or computer. For example, a processing unit may include multiple processors and/or computers, which may be integrated in a common housing or unit, or which may distributed among various units or housings. It may be noted that other types, numbers, or combinations of modules may be employed in alternate embodiments, and/or various aspects of modules described herein may be utilized in connection with different modules additionally or alternatively. Generally, the various aspects of the readout electronics unit 140 act individually or cooperatively with other aspects to perform one or more aspects of the methods, steps, or processes discussed herein.

The depicted readout electronics unit 140 includes a scan module 142, a data module 144, a position determination module 146, a communication module 148, and a memory 149. The scan module 142 and the data module 144 are utilized to collect and/or organize information (e.g., signals) from the modular imaging detectors 110 of the detection unit 160 for use in reconstructing an image. In the illustrated embodiment, the scan module 142 selects a column of pixels (which may run across surfaces of more than modular imaging detector 110), and the data module 144 reads any signals (e.g., signals generated responsive to the impingement of light upon a pixel) present across one or more rows of pixels (which also may run across surfaces of more than one modular imaging detector). For example, for the 2×3 arrangement shown in FIG. 1, a column may run across two modular imaging detectors 110 and a row may run across three modular imaging detectors 110. Any identified signals (e.g., a voltage above a threshold level) may thus be identified by row and column. The scan module 142 may then select a different column, and the data module again reads any signals. Using the identified signals collected during an acquisition period, counts for pixels may be accumulated and used to reconstruct an image.

The position determination module 146 in the depicted embodiment is configured to determine at least one of a position or an orientation for the modular imaging detectors 110. For example, each modular imaging detector 110 may be provided with a unique or signature resistance. The readout electronics unit 140 may then send a voltage pulse to each of the modular imaging detectors 110, and based on the current read for a given sampled modular imaging detector 110, determine the resistance for each detector (e.g., by dividing the voltage by the current) and thus determine the identity of the sampled detector. The identity for each modular image detector relative to position on the detection unit 160 may be determined, and thus signals from each detector may be appropriately located relative to signals from other detectors when reconstructing an image. In some embodiments, a phantom may be imaged or a test pattern (e.g., a test pattern of light directed toward photodiodes of a detection unit) used to identify the location of the various modular detectors. For example, a detector module producing a signal known to correlate to a portion of a phantom or test pattern may be located based on the location of the portion of the phantom or test pattern.

Further, the strength of a test signal (e.g., a signal provided during the imaging of a phantom or use of a test pattern) may be used to determine an orientation of various modular imaging detectors. For example, relatively strong signals may be associated with modular imaging detectors oriented directly toward a light or X-ray source, while relatively weak signals may be associated with modular imaging detectors oriented at an acute or oblique angle toward the light or X-ray source. As another example, a relatively strong signal may indicate that a scintillator is oriented toward an X-ray source while a relatively weak signal may indicate that a scintillator is oriented away from an X-ray source (e.g., the substrate interposed between source and scintillator, resulting in lower X-ray reception and lower output signals). By providing for automatic determination of the location of the individual modular imaging detectors within an array forming the detection unit 160, various embodiments allow for improved ease in set-up or initialization of an imaging system, and also provide for convenient and easy re-initialization or subsequent setup when modular imaging detectors are re-arranged from an initial configuration to a modified configuration.

The depicted communication module 148 is configured to provide information from the readout electronics unit 140 to an external system, such as an image reconstruction system. For example, the communication module 148 may provide information read by the scan module 142 and data module 144 to a reconstruction system. As another example, the communication module 148 may provide mapping information regarding the relative location of different modular imaging units with respect to each other to a reconstruction system. For example, in embodiments where the modular imaging units are independently electrically coupled to readout electronics, column and row information may be limited to location within a single modular imaging detector instead of corresponding to columns and rows across an entire detection unit surface. The mapping information may be used to correlate signals from each of the various modular imaging detectors with an appropriate location of the detection unit.

It may be noted that, while in the illustrated embodiment the readout electronics unit 140 is electrically coupled to the detection unit 160 via a single electrical link 150 (e.g., a link coupling the readout electronics unit to one modular imaging detector that it is in turn directly or indirectly coupled to the other modular imaging detectors), in other embodiments each modular imaging detector may be independently coupled to one or more aspects of the readout electronics unit 140 via a dedicated link. It may further be noted that the readout electronics unit 140 may also include or be associated with additional electronics such as power supplies (e.g., for use with the scan and data modules, for sending test signals or pulses, or the like), or a field programmable gate array (FPGA) to collect data, among others. Additional processing related to image reconstruction (e.g., gain correction, offset correction) may be performed by the readout electronics unit 140 or an external image reconstruction system. It may be noted that various embodiments may include additional components, or may not include all of the components shown in FIG. 1 (for example, various embodiments may provide sub-systems for use with other sub-systems to provide an imaging system). Further, it may be noted that certain aspects of the imaging system 100 shown as separate blocks in FIG. 1 may be incorporated into a single physical entity, and/or aspects shown as a single block in FIG. 1 may be shared or divided among two or more physical entities.

Figure 4:
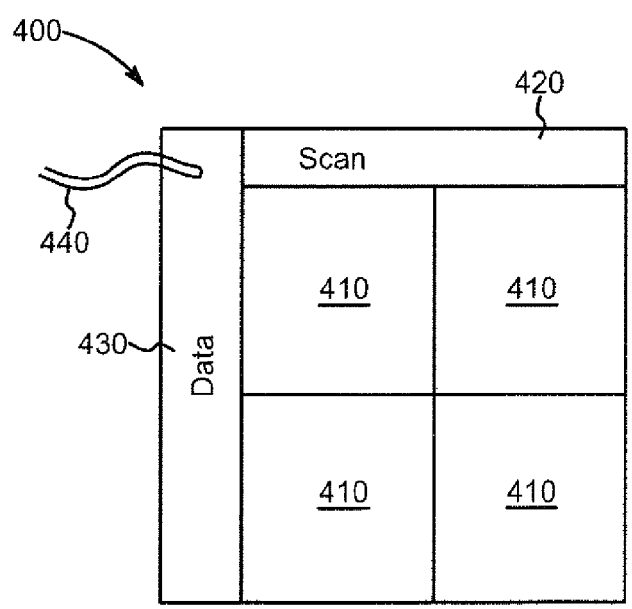
FIG. 4 is a schematic diagram illustrating modular detectors coupled to a common readout electronics unit in accordance with various embodiments.

FIG. 4 illustrates a schematic view of an example detection unit 400 formed in accordance with various embodiments. In FIG. 4, readout electronics are housed or disposed on a shared structure with image collection componentry. For example, the readout electronics of FIG. 4 may be disposed between image collection componentry (e.g., photodiodes) and a substrate, and/or alongside image collection componentry. In the embodiment depicted in FIG. 4, the detection unit 400 includes four modular imaging detectors 410 arranged in a 2×2 array, a scan module 420, and a read module 430. The modular imaging detectors 410 may be electrically coupled to each other (directly or indirectly), with the scan module 420 and read module 430 also electrically coupled to each of the modular imaging detectors 410 (either directly or indirectly). Thus, in FIG. 4, the read module 430 may read across all of the modular imaging detectors 410. The read module 430 is joined to an external system (e.g., image reconstruction system) via link 440, which may, for example, be a cable.

Figure 5:
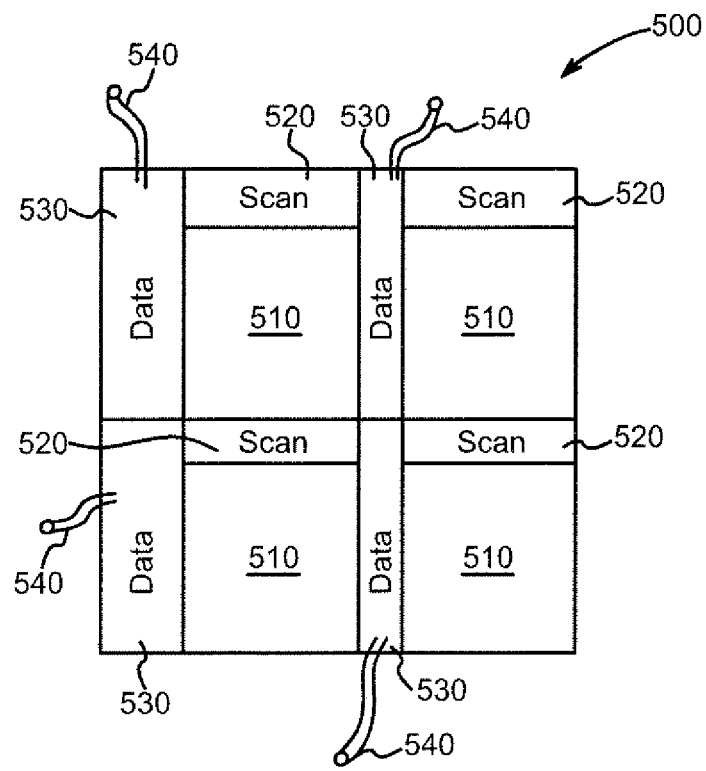
FIG. 5 is a schematic diagram illustrating modular detectors having dedicated readout electronics units in accordance with various embodiments.

As discussed herein, in various embodiments, each modular imaging detector may be independently coupled to readout electronics. FIG. 5 illustrates a schematic view of an example detection unit 500 formed in accordance with various embodiments. In FIG. 5, readout electronics units for each modular detector are housed or disposed on a shared structure with image collection componentry, and each modular imaging detector has associated therewith dedicated readout electronics (e.g., a dedicated scan and read module for that particular modular imaging detector). The modular imaging detectors of the detection unit 500 are mechanically, but not electrically, coupled to each other. The readout electronics of FIG. 5 may be disposed between image collection componentry (e.g., photodiodes) and a substrate, and/or alongside image collection componentry. In the embodiment depicted in FIG. 5, the detection unit 500 includes four modular imaging detectors 510 arranged in a 2×2 array, four scan modules 520 (each modular imaging detector has a dedicated scan module assigned thereto), and four read modules 530 (each modular imaging detector has a dedicated read module assigned thereto). Thus, in FIG. 5, each read module 530 reads across only a particular one of the modular imaging detectors 510. Each read module 530 is joined to an external system (e.g., image reconstruction system) via a respective corresponding dedicated link 540. In various embodiments, use of modular imaging detectors that are not electrically coupled to each other may simplify the design and/or production of the mechanical connection features (e.g., by eliminating the electrical connections associated therewith), and/or provide for easier or more convenient dis-assembly and re-assembly of modules into different configurations on-site or in the field.

In various embodiments, mechanical interconnection features may be employed that are configured to secure a first modular imaging detector to at least one other modular imaging detector in more than one available orientation. For example, a first orientation may be provided where the joined modular imaging detectors face in a common direction (e.g., scintillators or an imaging information reception surface is oriented in the same direction), while one or more additional orientations may be provided in which the modular imaging detectors face in different directions (e.g., scintillators or an imaging information reception surface is oriented in different directions). The different directions may be at an oblique, perpendicular, or acute angle with respect to each other, or may be in a generally opposite direction.

Figure 6:
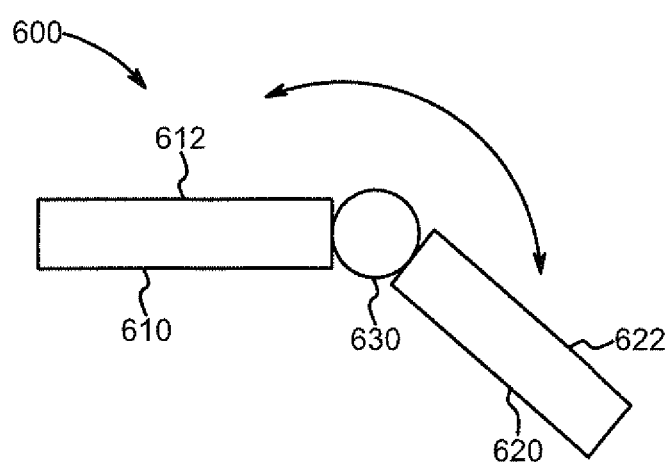
FIG. 6 is a schematic diagram of joined modular detectors in accordance with various embodiments.

FIG. 6 provides a side view of a detection unit 600 formed in accordance with various embodiments. The detection unit 600 includes a first modular detector 610 joined to a second modular detector 620 via a hinge mechanism 630. The hinge mechanism 630 may be formed by cooperating mechanical interconnection features of the first modular detector 610 and the second modular detector 620. As seen in FIG. 6, the hinge mechanism 630 is configured to allow the second modular detector 620 to rotate with respect to the first modular detector 610, such that an imaging information reception surface 622 (e.g., a surface upon which photodiodes or other image reception componentry is disposed) of the second modular detector 620 is oriented in a different direction (e.g., at an angle to) an imaging information reception surface 612 of the first modular detector 610. The detection unit 600 may also include additional modular detectors (not shown) pivotally connected on either side of the illustrated modular detectors to allow for the formation of larger and/or compound curves or shapes. The detection unit 600 also provides one example of a flexible detection unit. For example, even if the substrates or support structures of the individual modular detectors are rigid, the detection unit 600 may be flexible or conformable to a desired shape due to articulation provided at hinged or pivoting mechanisms between the individual modular detectors. Further still, the range of rotation between neighboring modular detectors may be limited by a stop or other mechanical arrangement.

Yet further still, the detection unit 600 may be configured to be flexible in one direction but rigid in another. For example, mechanical interconnection features along a first direction may cooperate to allow pivoting but mechanical interconnection features along a direction transverse to first direction may not allow pivoting. Thus, for example, a length of a detection unit may be bent along a radius of a pipe while a width of the detection unit may remain rigid along an axial direction of the pipe. In various embodiments, allowing flexibility in only one direction may provide for useful positioning of a detection unit about an object to be imaged, while reducing overall flexibility or distortion, and may provide improved imaging (e.g., more consistent or reliable imaging information) in comparison to a detection unit that would be flexible in all directions.

Figure 7:
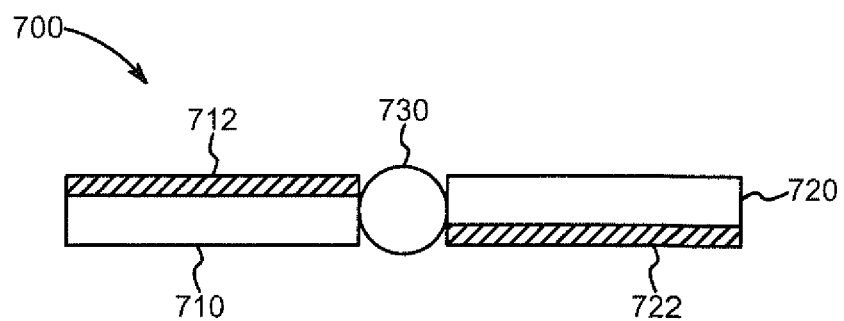
FIG. 7 is a schematic diagram of joined modular detectors in accordance with various embodiments.

FIG. 7 provides a side view of a detection unit 700 that includes a first modular detector 710 oriented in a generally opposite direction to a second modular detector 720. The first modular detector 710 includes a first reception surface 712 and the second modular detector 720 includes a second reception surface 722. The first reception surface 712 and second reception surface 722, as seen in FIG. 7, face opposite directions, and are oriented generally opposite to each other. As used herein, a first and second detector that are oriented generally opposite to each other may be understood as being arranged such that a reception surface of the first detector receives waves or photons directly from a source (e.g., without the waves or photons having to pass through a substrate or support structure of the first detector), while a substrate or support structure of the second detector is interposed between the reception surface of the second detector and the source. It may be noted that "generally opposite" directions as used herein may be, but need not necessarily be, at 180 degrees to each other. For example, the first modular detector 710 and the second modular detector 720 are joined by a hinge mechanism 730 in the illustrated embodiment. Thus, the first modular detector 710 and second modular detector 720 may be angled (e.g., at an acute or oblique angle) with respect to each other and also oriented in generally opposite directions. Use of modular detectors that may be oriented in generally opposite directions in various embodiments may be utilized to eliminate or reduce gaps between reception surfaces due to bends in complex shapes, for example shapes that may transition between convex and concave. (See also FIG. 12 and related discussion.)

In various embodiments, detection units formed by modular imaging detectors may utilize stiffeners or stiffening elements, mechanisms, or structures. The stiffeners may be configured to mount to adjacent or neighboring modular imaging detectors and to maintain the mounted modular imaging detectors in a predetermined position with respect to each other. In some embodiments, the modular imaging detectors may be substantially aligned with each other or form a straight unit (or portion thereof), while in other embodiments the predetermined position may provide a curved or angled shape.

Figure 8:
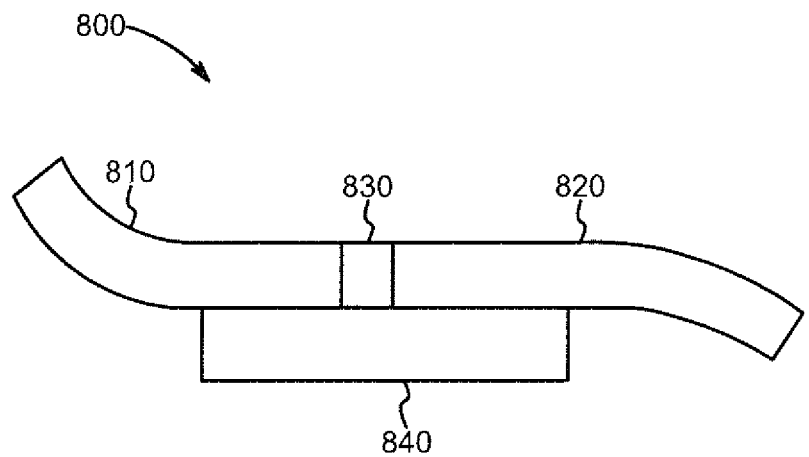
FIG. 8 is a schematic diagram of a detection unit including a stiffener in accordance with various embodiments.

FIG. 8 illustrates a detection unit 800 formed in accordance with various embodiments. The depicted detection unit 800 includes a first modular detector 810 and a second modular detector 820 joined by interconnection 830 (e.g., an interconnection formed by cooperating mechanical interconnection features of the first modular detector 810 and the second modular detector 820). In the illustrated embodiment, the modular detectors as well as the interconnection may be flexible. The detection unit 800 also includes a stiffener 840 positioned beneath (e.g., on a side opposite a reception surface of the modular detectors) and on either side of the interconnection 830, and mounted to the first modular detector 810 and the second modular detector 820. The stiffener 840 may be a substantially rigid member that is configured to prevent flexing of the modular detectors proximate to the mounting location of the stiffener 840. As seen in FIG. 8, the depicted stiffener 840 does not extend along the entire length of either of the modular detectors, such that the detectors are permitted to flex at positions along their length not reinforced by the stiffener 840. It may be noted that additional modular detectors and/or stiffeners may be provided in various embodiments to provide larger detection units and/or complex or compound curves. In various embodiments, the use of stiffeners may reduce the risk of separation or disconnection between modular detectors at interconnections during flexing or use of a detection unit and/or provide more consistency or control of a shape formed by a detection unit, for example.

Figure 9:
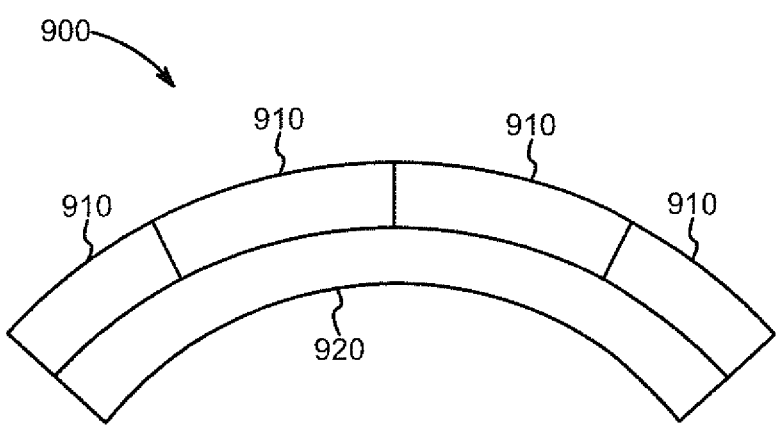
FIG. 9 is a schematic diagram of a detection unit including a stiffener in accordance with various embodiments.

In other embodiments, a stiffener may extend along the entire length (and/or width) of a modular detector or group of modular detectors. FIG. 9 illustrates a detection unit 900 formed in accordance with various embodiments. The depicted detection unit 900 includes four modular detectors 910 joined to neighboring detectors via interconnections (not shown in FIG. 9 for clarity and ease of illustration). The modular detectors 910 and/or interconnections are flexible, or allow for the deformation of a shape formed by the modular detectors 910 in the absence of sufficient reinforcement. The detection unit 900 also includes a stiffener 920. In the illustrated embodiment, the stiffener 920 is formed having a continuous radius and extends the length and width of the detection unit 900. Thus, the detection unit 900 may be maintained having a curved reception surface (e.g., the surface opposite a surface to which the stiffener 920 is mounted). The detection unit 900 may thus be maintained in a predetermined shape corresponding to the shape of the stiffener 920. In various embodiments, the stiffener may have different shapes, such as straight, stepped, angled, U-shaped, V-shaped, or having one more compound or complex bends, among others. In various embodiments, differently shaped stiffeners may be provided for a given detection unit to provide a variety of shapes allowing for imaging of differently shaped objects, while maintaining high image quality (e.g., reducing any imaging issues related to flexing of a detection unit or inconsistency in shape of a detection unit). Further, the stiffener (or stiffeners) may be utilized in some applications of a detection unit but others. Thus, a detection unit of flexible materials (e.g., flexible modular imaging detectors and/or flexible connections therebetween) may be used with a stiffener in applications where rigidity is desired (e.g., for imaging quality), or may be used without a stiffener when desired for improved conformance to a shape of a given object to be imaged. Further, stiffeners may be provided for commonly encountered shapes of objects to be imaged, while the stiffeners may not be employed for rarely encountered shapes.

Figure 10A:
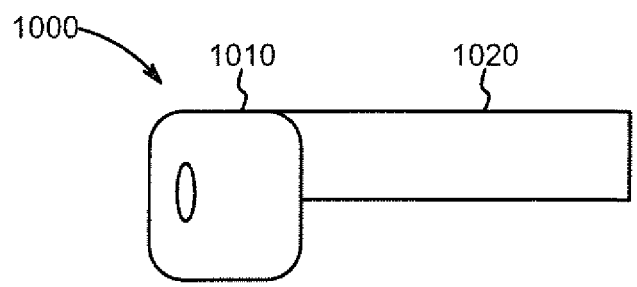
FIGS. 10a-d illustrate the use of flexible detection units along with rigid electronics units (e.g., readout electronic units) in accordance with various embodiments.
Figure 10B:
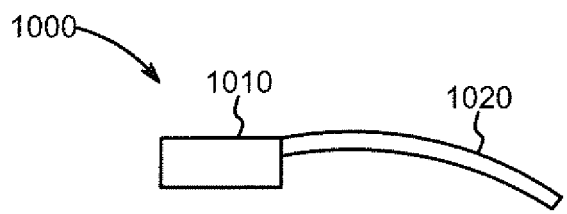
Figure 10C:
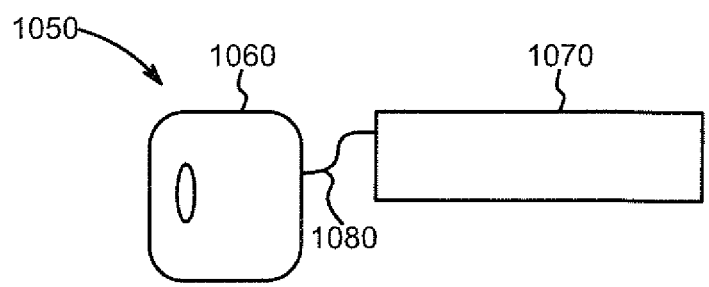
Figure 10D:
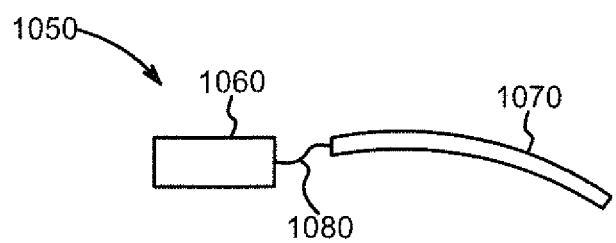

FIGS. 10a-d illustrate the use of flexible detection units along with rigid electronics units (e.g., readout electronic units) in accordance with various embodiments. As seen in FIGS. 10a and 10b, an imaging system 1000 includes an electronics unit 1010 and a detection unit 1020. The depicted electronics unit 1010 is rigid, and may provide rugged protection for sensitive electronic equipment. The detection unit 1020 is generally flexible and comprised of modular imaging detectors. (The modular imaging detectors themselves may be rigid, but joined by flexible connections to provide flexibility to the detection unit 1020.) In FIGS. 10a and 10b, the electronics unit 1010 and the detection unit 1020 are directly joined to each other. The connection between the electronics unit 1010 and the detection unit 1020 may be permanent or removable. Further, the connection may be remote or indirect. For example, as seen in FIGS. 10c and 10d, an imaging system 1050 includes an electronics unit 1060 and a detection unit 1070 joined by a link 1080 (e.g., flexible cable). Again, the electronics unit 1060 may be rigid and the detection unit 1070 flexible, with the link 1080 permanent or removable in various embodiments. Thus, a rigid portion may be employed to house digital controls, power supplies and associated circuitry, and communication components, while a flexible detection unit allows for placement of a detector around differently shaped items. Such imaging systems may provide improved performance, for example, of radiography imaging systems. For example, the flexible detection unit may be thin enough to be slipped under a patient's arm (or other anatomy), and flexible enough to conform to a variety of patient sizes and shapes. Further, the flexible detection unit may be sized and configured to be utilized for different portions of anatomy. For example, the detection unit may be long enough to be positioned along a length of an arm to image longer bones, and flexible enough to be wrapped around a head or neck.

Figure 11:
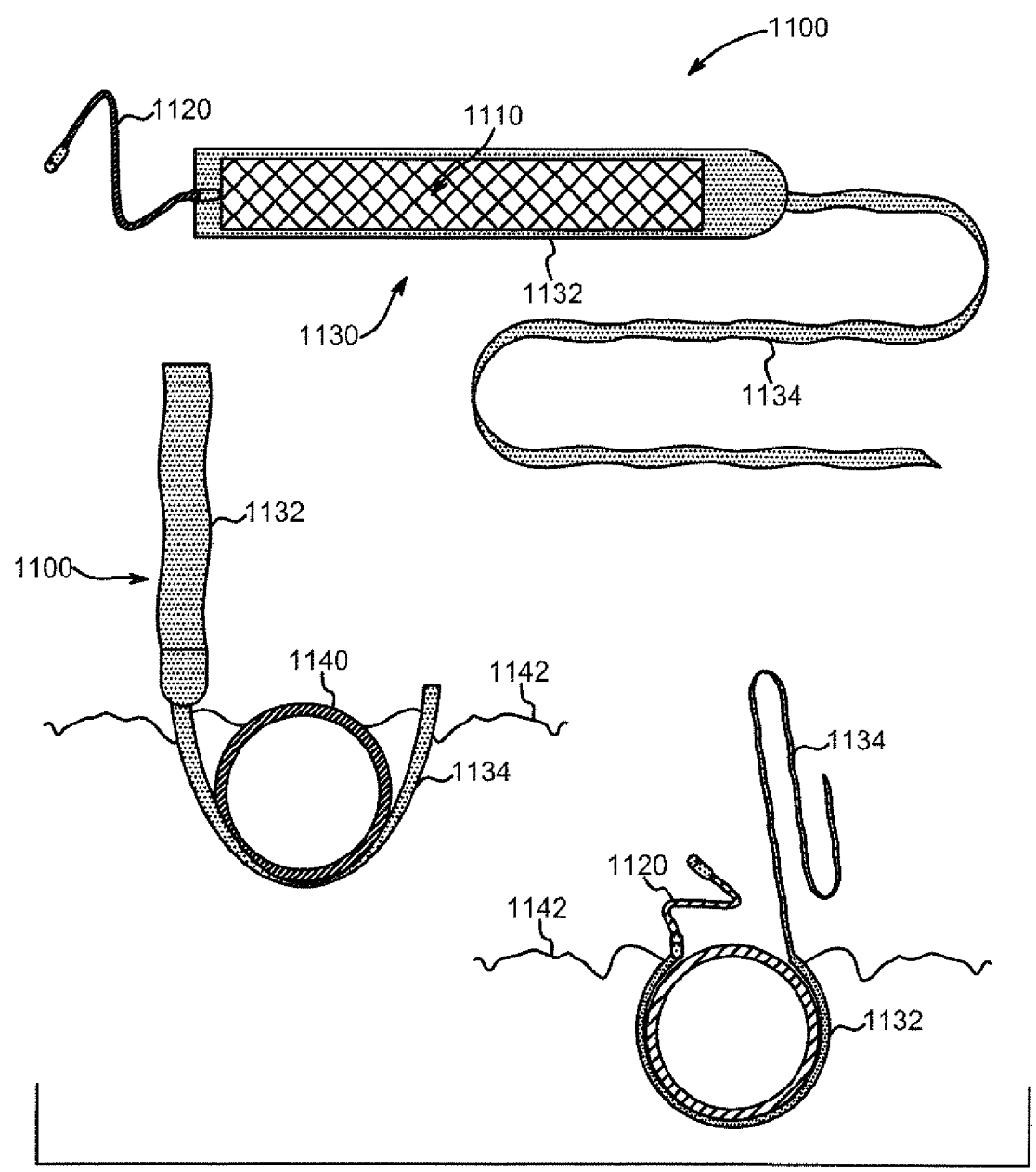
FIG. 11 provides a schematic view of an imaging detection system 1100 in accordance with various embodiments.

FIG. 11 provides a schematic view of an imaging detection system 1100 in accordance with various embodiments. The imaging detection system 1100 includes a detection unit 1110, a link 1120, and a protective cover 1130. The detection unit 1110 may be generally similar to detection units discussed herein, and may be formed using modular imaging detectors. The detection unit 1110 of the illustrated embodiment is flexible (e.g., formed from flexible modular imaging detectors and/or using flexible joints or connections between modular imaging detectors). The link 1120 may be configured as a flexible cable configured to communicate signals from the detection unit 1110 to a system or unit external to the detection unit 1110 (e.g., readout electronics and/or an image reconstruction system and/or a system for storing and/or displaying data acquired using the detection unit 1110).

The protective cover 1130 is configured to be disposed around the detection unit 1110 and to provide protection to the components (e.g., substrates, photodioides, scintillators, or the like) of the detection unit 1110. The protective cover 1130 may be formed of material rugged enough to protect the detection unit 1110 while still allowing for flexibility for forming the detection unit 1110 about objects to be imaged, and providing transparency to or low attenuation of waves or photons to be used in imaging (e.g., X-rays). The depicted protective cover 1130 includes a sleeve 1132 and leader section 1134. The sleeve 1132 is configured to house and protect the detection unit 1110, while the leader section 1134, which extends outward from the sleeve 1132, is configured to help in the positioning and placement of the imaging detection system 1100. The leader section 1134 may be configured as a flexible member that is "fished" around an object to be imaged and used to position the imaging detection system 1100. For example, the leader section 1134 may be narrower along at least one dimension than the sleeve 1132 and/or more flexible than the detection unit 1110. Thus, the leader section 1134 may be more easily initially fit around an object to be imaged, and then pulled around and away from the object to be imaged to position the detection unit 1110 within the sleeve 1132 about the object to be imaged.

For example, as seen in the middle and bottom of FIG. 11, a pipe 1140 may be imaged using the imaging detection system 1100 (e.g., in connection with an X-ray source disposed within the pipe 1140. The pipe 1140 may be located underneath a surface 1142 in a hard to reach location. As shown in the middle of FIG. 11, the leader section may be introduced and fit around the pipe 1140. Then, as shown in the bottom of FIG. 11, the leader section may be pulled around and away from the pipe 1140 until the detection unit 1110 is in a desired position for imaging.

Figure 12A:
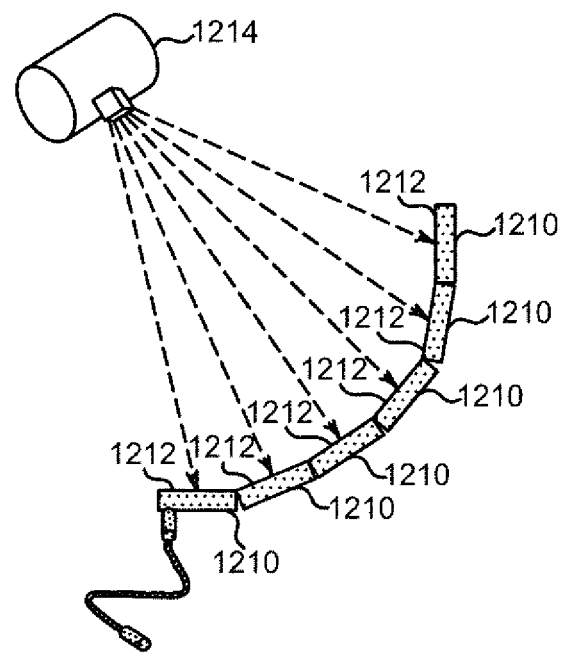
FIGS. 12a-d provide various views of imaging systems having modular detectors arranged in curved orientations.

FIGS. 12a-d provide various views of imaging systems having modular detectors arranged in curved orientations. Generally, to improve signal strength, reception surfaces of modular imaging detectors may be oriented toward a source as seen in FIG. 12a. As seen in FIG. 12a, modular imaging detectors 1210 having reception surfaces 1212 are disposed in a generally concave shape about an X-ray source 1214. In the embodiments depicted in FIGS. 12a-d, the modular imaging detectors 1210 are rigid, but joined by flexible connections (e.g., at least some range of pivoting or rotation is available between the modular imaging detectors 1210). In FIG. 12a, each of the reception surfaces 1212 are oriented toward the X-ray source 1214.

Figure 12B:
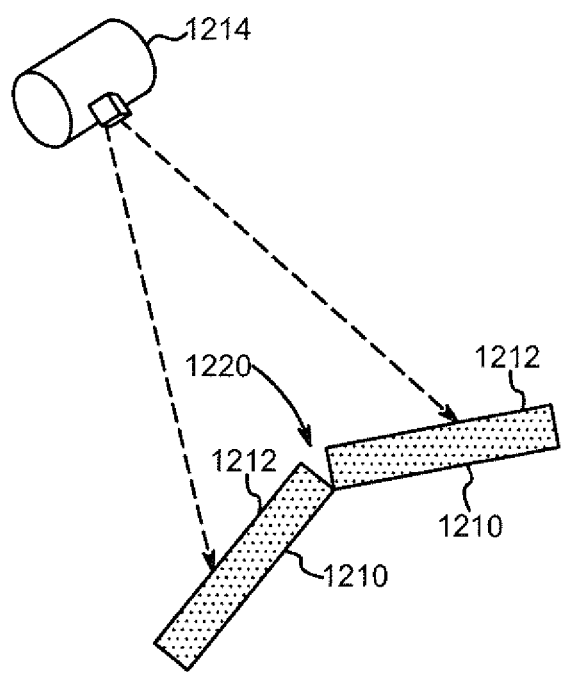
Figure 12C:
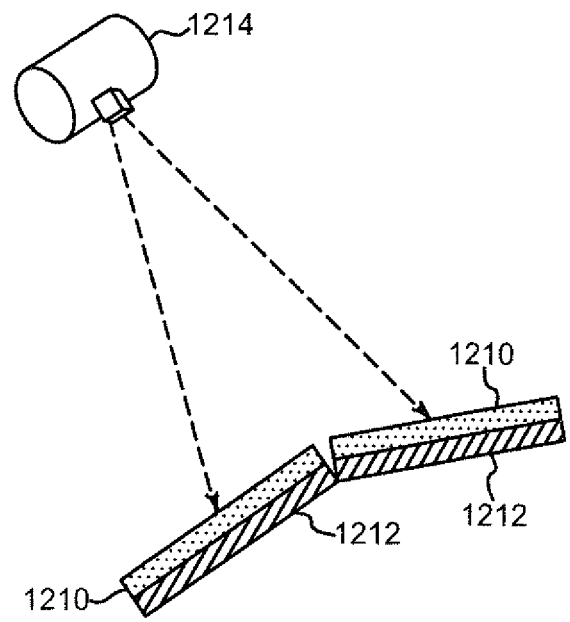

However, orientation of reception surfaces toward an X-ray source may result in one or more portions of an object being imaged not being sufficiently covered by a corresponding detector surface (e.g., a detector may effectively be blind to a portion of the object, due to the X-rays passing through the portion of the object not being received by a detector surface). For example, as seen in FIG. 12b, when modular imaging detectors 1210 are arranged in a convex curve with respect to the X-ray source 1214, a gap 1220 is formed between the reception surfaces 1212 of the modular imaging detectors 1210. One potential approach to reducing or eliminating the gap is depicted in FIG. 12c. As seen in FIG. 12c, the reception surfaces 1212 (e.g., surfaces on which photodiodes are disposed, with scintillators disposed on the photodiodes) are each oriented away from the X-ray source 1214. However, such an approach may not be as effective as desired for complex shapes in which a curve of a detection unit includes convex portions as well as concave portions.

Figure 12D:
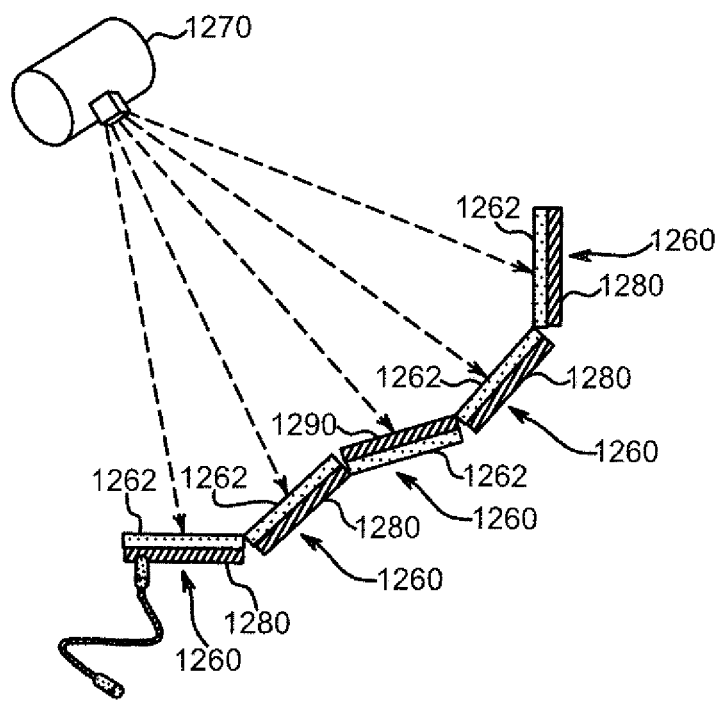

As seen in FIG. 12d, modular detectors 1260 having reception surfaces 1262 are disposed about an X-ray source 1270 in a curve that includes both convex and concave portions. To help eliminate or reduce any resulting gaps between adjacent reception surfaces 1262, the modular detectors 1260 are arranged such that some of the modular detectors 1260 are oriented toward the X-ray source 1270 while others of the modular detectors 1260 are oriented away from the X-ray source 1270. For example, the modular detectors 1280 are oriented toward the X-ray source 1270 and the modular detector 1290 is oriented away from the X-ray source 1270. As discussed herein (see, e.g., FIG. 7 and related discussion), the modular detectors 1280 may be understood as being oriented generally opposite to the modular detector 1290. Further, mechanical interconnection features may be configured so that individual ones of the modular detectors 1260 may be snapped or joined together in either the orientation toward the source or the orientation away from the source (e.g., the mechanical interconnection features may be symmetric about both a center of a length and a center of a depth of an edge along which adjacent modular detectors are joined). Accordingly, the modular detectors 1260 may be disconnected and re-connected in different orientations depending on the locations of the concave and convex portions along a length of a curve to form a wide variety of shapes while eliminating or reducing gaps between reception surfaces. It may be noted that relatively small gaps separating adjacent reception surfaces and/or due to space occupied by mechanical interconnection features may be present in various embodiments. Image quality, however, may not be substantially or significantly affected if the gaps are relatively small (e.g., one pixel width).

Figure 13:
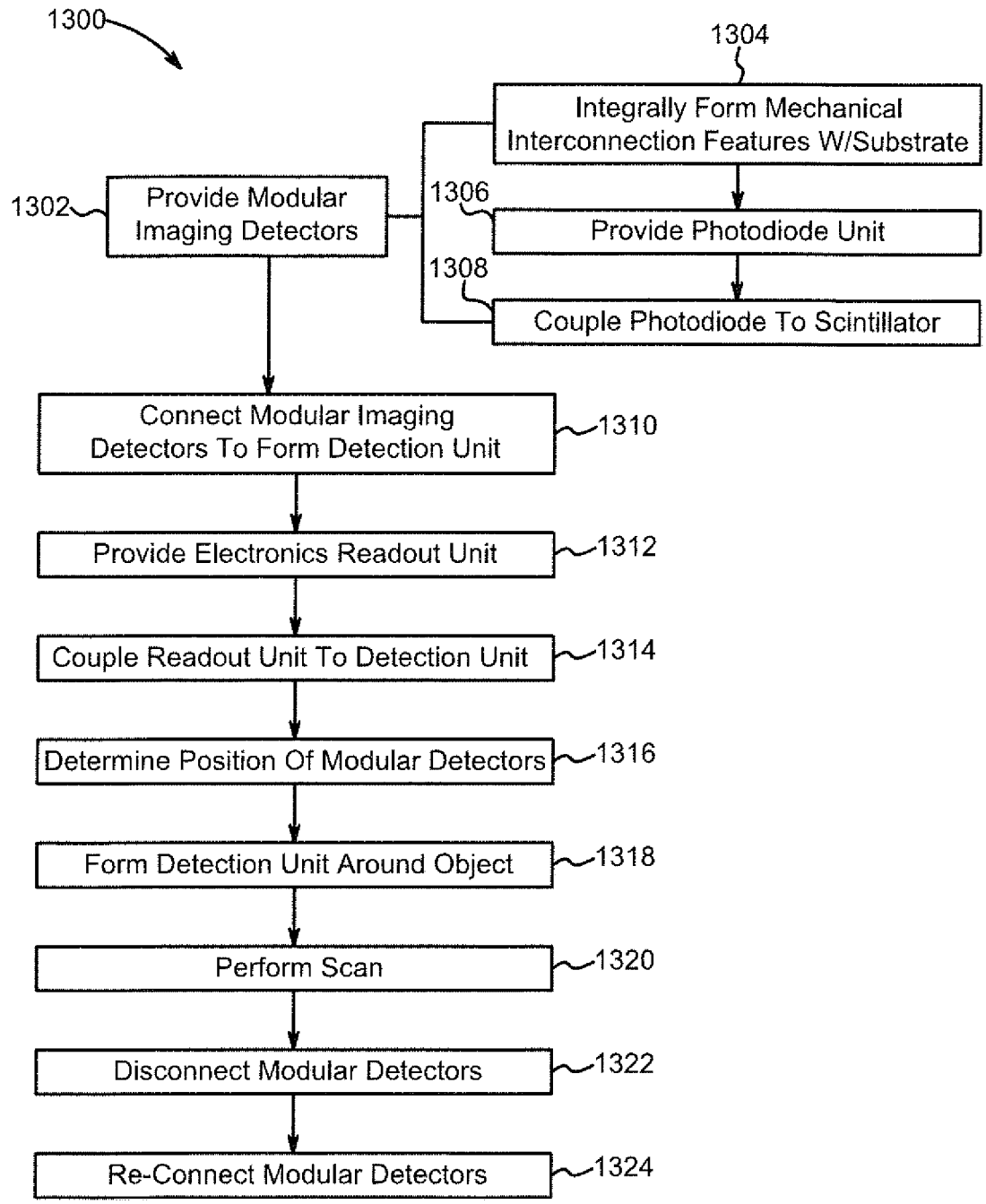
FIG. 13 is a flowchart of a method in accordance with various embodiments.

FIG. 13 provides a flowchart of a method 1300 (e.g., for providing an imaging detection system or aspects thereof) in accordance with various embodiments. The method 1300, for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1300 may be able to be used as one or more algorithms to direct hardware (e.g., one or more aspects of the readout electronics unit 140) to perform one or more operations described herein.

At 1302, modular imaging detectors (e.g., modular imaging detectors 110) are provided. As discussed herein, each modular imaging detector may include a reception surface (e.g., including pixels disposed on a substrate) configured to collect imaging data, as well as a mechanical interconnection feature configured to cooperate with corresponding mechanical interconnection features of one or more other modular imaging detectors to secure the modular imaging detectors together. By way of example, a modular imaging detector may be formed or assembled as described by substeps 1304-1308 in various embodiments.

At 1304, mechanical interconnection features are integrally formed with a substrate. For example, the substrate may be formed, with the mechanical interconnection feature included as a part of the substrate, during a 3D printing process. As another example, the mechanical interconnection feature may be 3D printed on a pre-formed substrate (e.g., circuit board). At 1306, at least one photodiode unit is provided on the substrate. The photodiode unit (which may include one or more photodiodes) may be formed, for example, using a CMOS forming process. At 1308, the photodiode is operably coupled to a scintillator. For example, a scintillator crystal may be mounted on or near the photodiode. When the scintillator is impacted by a photon, the scintillator produces light. The light is received by the photodiode unit which produces an electric signal responsive to the light. The electric signal produced by the photodiode may be used to count the incidence of X-rays on a given portion of a detector, and used to reconstruct an image. For example, X-ray counts may be used to determine X-ray attenuation for different portions of an object, and an image reconstructed based on the attenuation of the various portions of the object (e.g., relatively darker shades for portions having lower attenuation and relatively brighter shades for portions with higher attenuation).

At 1310, the modular imaging detectors are connected in a predetermined arrangement to form a detection unit (e.g., detection unit 160). Different numbers of modular imaging detectors may be employed to provide a desired size (e.g., more modular imaging detectors for larger sizes and less modular imaging detectors for smaller sizes). The modular imaging detectors, as discussed herein, may be joined using cooperating mechanical features of neighboring or adjacent imaging detectors. In some embodiments, neighboring modular imaging detectors are also electrically coupled to each other, while in other embodiments neighboring modular imaging detectors are not electrically coupled to each other.

At 1312, an electronics readout unit (e.g., electronics readout unit 140) is provided. The electronics readout unit is configured to receive signals corresponding to imaging data from the modular imaging detectors. The electronics readout unit may be in a separate housing or physical component from the detection unit. In some embodiments, all or a portion of the electronics readout unit may be disposed within a common unit with one or more modular imaging detectors (e.g., disposed on a substrate of a modular imaging detector). In some embodiments, an electronics readout unit may be shared by all modular imaging detectors of a detection unit, while in other embodiments each modular imaging detector may have a particular electronics readout unit dedicated thereto. At 1314, the electronics readout unit is electrically coupled to the detection unit (e.g., the modular imaging detectors of the detection unit). The electronics readout unit may be coupled separately to independent modular detectors, or may be coupled to all modular detectors of a given detection unit via a common link (e.g., cable).

At 1316, the position of each modular detector within the detector unit may be determined in some embodiments. For example, a test voltage may be used to identify a signature or unique resistance value associated with each modular detector, or a phantom or test signal may be used to determine the location of the various modular detectors. Using the identified locations, the modular detectors may be mapped and signals produced by the pixels of each modular detector may thus be correlated to an appropriate position within an image being reconstructed. It may be noted that determination of the position of modular detectors may not be performed, for example when modular detectors are electrically connected to each other and data is read out across columns and/or rows that span the entire detection unit.

At 1318, the detection unit is formed around an object to be imaged. The detection unit may be flexible due to flexibility in the modular detectors and/or in the connections between modular detectors. Further, the detection unit may be flexible along a first direction, but not along a second direction (e.g., a direction transverse to the first direction). The detection unit may be formed an object to be imaged such as a pipe or, as another example, a portion of human anatomy such as knee, head, neck, or arm, among others.

At 1320, a scan is performed. For example, X-rays may be provided from a source and transmitted through an object to be imaged to the detection unit. Based on the amount of attenuation caused by the various portions of the object within the field of view of the detection unit, an image of the object may be reconstructed. For example, signals from the modular detectors may be acquired or received by the readout electronics unit, with information from the readout electronics unit processed by an image reconstruction system to provide counts, and an image reconstructed using the counts.

At 1322, all or a portion of the modular detectors are disconnected from each other. The modular detectors may be disconnected from each other to perform maintenance (e.g., replace a damaged or old modular detector) or to provide a new configuration having a differently sized and/or shaped detection surface. For example, at 1324 the modular detectors are reconnected to each other in a different configuration. For example, additional detectors may be added to provide a larger detection unit, detectors may be removed to provide a smaller detection unit, and/or a different shape of detector unit may be provided. In some embodiments, for example, where the location of the individual modular detectors has been determined for a different, previous configuration, the new locations of the modular detectors may be determined after re-arrangement into the new configuration.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. An imaging system comprising:
    plural modular imaging detectors, each modular imaging detector comprising
        plural pixels configured to collect imaging data,
        a substrate, wherein the pixels are disposed on a surface of the substrate, and
        a mechanical interconnection feature, the mechanical interconnection feature configured to cooperate with a corresponding mechanical interconnection feature of at least one other of the modular imaging detectors to directly join the modular imaging detector to the at least one other of the modular imaging detectors, wherein the mechanical interconnection feature is integrally formed with the substrate and extends from the substrate;
    wherein at least some of the plural modular imaging detectors are oriented in a same direction as an immediately neighboring modular imaging detector; and
    a readout electronics unit configured to be operably coupled to the modular imaging detectors and to receive signals corresponding to the imaging data from the modular imaging detectors.

2. The imaging system of claim 1, wherein the modular imaging detectors comprise photodiodes.

3. The imaging system of claim 2, wherein each modular imaging detector comprises a scintillator operably coupled to the modular imaging detector and configured to provide light to the photodiode of the modular imaging detector responsive to receiving X-ray radiation.

4. The imaging system of claim 1, wherein the mechanical interconnection feature is configured to releasably secure the modular imaging detector to a neighboring modular imaging detector in a first orientation in which the modular imaging detector and the at least one other modular imaging detector are facing a common direction, and in a second orientation in which the modular imaging detector and the neighboring modular imaging detector are facing in a different direction, wherein the modular imaging detector and the neighboring module imaging detector define a concave shape with respect to an object being imaged in the first orientation, and wherein the modular imaging detector and the neighboring module imaging detector define a convex shape with respect to the object being imaged in the second orientation.

5. The imaging system of claim 4, wherein the different direction is in a generally opposite direction to the common direction.

6. The imaging system of claim 4, wherein the mechanical interconnection feature is configured to allow rotation of the modular imaging detector with respect to the at least one other modular imaging detector.

7. The imaging system of claim 1, wherein the mechanical interconnection feature comprises tabs and slots that are complementary with tabs and slots of the corresponding mechanical interconnection feature of the at least one other modular imaging detector.

8. The imaging system of claim 1, wherein the modular imaging detectors are coupled to the readout electronics unit via a shared connection.

9. The imaging system of claim 1, wherein each modular imaging detector is directly electrically coupled to the at least one other modular imaging detector.

10. The imaging system of claim 1, wherein each modular imaging detector is independently electrically coupled to the readout electronics unit.

11. An imaging system comprising:
plural modular imaging detectors, each modular imaging detector comprising
plural pixels configured to collect imaging data,
a substrate, wherein the pixels are disposed on a surface of the substrate, and
a mechanical interconnection feature, the mechanical interconnection feature configured to cooperate with a corresponding mechanical interconnection feature of at least one other of the modular imaging detectors to directly join the modular imaging detector to the at least one other of the modular imaging detectors;
wherein at least some of the plural modular imaging detectors are oriented in a same direction as an immediately neighboring modular imaging detector; and
a readout electronics unit configured to be operably coupled to the modular imaging detectors, and to receive signals corresponding to the imaging data from the modular imaging detectors and determine a position of the modular imaging detectors based on a signature resistance of the modular imaging detector.

12. The imaging system of claim 1, further comprising at least one stiffener, the at least one stiffener configured to mount to the modular imaging detector and the at least one other modular imaging detector and to maintain the module imaging detector and the at least one other modular imaging detector in a predetermined position with respect to each other.

13. An imaging system comprising:
plural modular imaging detectors operably coupled to each other, each modular imaging detector comprising
plural pixels configured to collect imaging data,
a substrate, wherein the pixels are disposed on a surface of the substrate, and
a mechanical interconnection feature, the mechanical interconnection feature configured to cooperate with a corresponding mechanical interconnection feature of at least one other of the modular imaging detectors to directly join the modular imaging detector to the at least one other of the modular imaging detectors, wherein the mechanical interconnection feature is integrally formed with the substrate and extends from the substrate,
wherein the plural modular imaging detectors are joined to each other to form a detection unit, the detection unit being flexible along at least one axis;
wherein at least some of the plural modular imaging detectors are oriented in a same direction as an immediately neighboring module imaging detector; and
a readout electronics unit configured to be operably coupled to the modular imaging detectors and to receive signals corresponding to the imaging data from the modular imaging detectors, wherein the modular imaging detectors are coupled to the readout electronics unit via a shared connection.

14. The imaging system of claim 13, further comprising a protective sleeve disposed about at least a portion of the detection unit.

15. An imaging system comprising:
plural modular imaging detectors operably coupled to each other, each modular imaging detector comprising
plural pixels configured to collect imaging data,
a substrate, wherein the pixels are disposed on a surface of the substrate, and
a mechanical interconnection feature, the mechanical interconnection feature configured to cooperate with a corresponding mechanical interconnection feature of at least one other of the modular imaging detectors to directly join the modular imaging detector to the at least one other of the modular imaging detectors,
wherein the plural modular imaging detectors are joined to each other to form a detection unit, the detection unit being flexible along at least one axis, and at least two of the plural modular imaging detectors are secured to each other in generally opposite orientations; and
a readout electronics unit configured to be operably coupled to the modular imaging detectors and to receive signals corresponding to the imaging data from the modular imaging detectors, wherein the modular imaging detectors are coupled to the readout electronics unit via a shared connection.

16. A method comprising:
providing plural modular imaging detectors, each modular imaging detector comprising
plural pixels configured to collect imaging data,
a substrate, wherein the pixels are disposed on a surface of the substrate, and
a mechanical interconnection feature, the mechanical interconnection feature configured to cooperate with a corresponding mechanical interconnection feature of at least one other of the modular imaging detectors to directly join the modular imaging detector to the at least one other of the modular imaging detectors, wherein the mechanical interconnection feature is integrally formed with the substrate and extends from the substrate;
connecting the modular imaging detectors in a predetermined arrangement to form a detection unit, wherein at least some of the plural modular imaging detectors are oriented in a same direction as an immediately neighboring module imaging detector in the predetermined arrangement;
providing a readout electronics unit to receive signals corresponding to the imaging data from the modular imaging detectors; and
electrically coupling the modular imaging detectors to the readout electronics unit.

17. The method of claim 16, wherein providing each modular imaging detector comprises:
providing at least one photodiode unit disposed on the substrate; and
operably coupling the at least one photodiode unit with at least one scintillator.

18. The method of claim 16, further comprising forming the detection unit about an object to be imaged.

19. The method of claim 16, further comprising disconnecting the modular imaging detectors from each other, and re-connecting the modular imaging detectors in a modified arrangement that is different from the predetermined arrangement.

* * * * *